United States Patent
Kang et al.

(10) Patent No.: US 9,100,677 B2
(45) Date of Patent: Aug. 4, 2015

(54) SERVER, CLIENT DEVICE, METHOD FOR GENERATING A TRANSPORT STREAM THEREOF AND PROCESSING THE TRANSPORT STREAM THEREOF

(75) Inventors: Dong-jin Kang, Suwon-si (KR); Dave Ahn, Suwon-si (KR); Ji-soon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 13/607,876

(22) Filed: Sep. 10, 2012

(65) Prior Publication Data

US 2013/0070923 A1 Mar. 21, 2013

(30) Foreign Application Priority Data

Sep. 21, 2011 (KR) .......................... 10-2011-0095393

(51) Int. Cl.
| | | |
|---|---|---|
| *G06F 21/00* | (2013.01) | |
| *H04L 29/06* | (2006.01) | |
| *H04N 21/258* | (2011.01) | |
| *H04N 21/2347* | (2011.01) | |
| *H04N 21/266* | (2011.01) | |
| *H04L 9/08* | (2006.01) | |
| *H04L 9/20* | (2006.01) | |
| *H04N 7/167* | (2011.01) | |

(52) U.S. Cl.
CPC ..... *H04N 21/25816* (2013.01); *H04N 21/2347* (2013.01); *H04N 21/26613* (2013.01)

(58) Field of Classification Search
USPC ........... 380/210, 277, 281, 42, 259, 284, 241; 705/50, 52; 713/176
See application file for complete search history.

(56) References Cited

U.S. PATENT DOCUMENTS

| | | | |
|---|---|---|---|
| 7,191,335 B1 * | 3/2007 | Maillard ........................ 713/176 |
| 2002/0094084 A1 * | 7/2002 | Wasilewski et al. .......... 380/241 |
| 2007/0294170 A1 * | 12/2007 | Vantalon et al. ................ 705/50 |

FOREIGN PATENT DOCUMENTS

| | | | |
|---|---|---|---|
| JP | 2008072198 A | * | 3/2008 |
| KR | 10-1060668 A | | 8/2011 |

OTHER PUBLICATIONS

Lotspiech, J.; Nusser, S.; Pestoni, F.; "Broadcast encryption's bright future", Computer vol. 35, Issue: 8; DOI: 10.1109/MC.2002.1023789; Publication Year: Aug. 2002, pp. 57-63.*

* cited by examiner

*Primary Examiner* — Andrew Nalven
*Assistant Examiner* — Courtney Fields
(74) *Attorney, Agent, or Firm* — Sughrue Mion, PLLC (57) ABSTRACT

A method for generating a transport stream of a server is provided. The method for generating a transport stream of a server which sends broadcasting content to a client device comprises: scrambling broadcasting content by using a specific key; adding at least one content-encryption message which includes the specific key and a device key for obtaining the specific key from the at least one content-encryption message to the broadcasting content so as to generate a transport stream; and sending the generated transport stream to the client device.

16 Claims, 7 Drawing Sheets

SERVER, CLIENT DEVICE, METHOD FOR GENERATING A TRANSPORT STREAM THEREOF AND PROCESSING THE TRANSPORT STREAM THEREOF

CROSS-REFERENCE TO RELATED APPLICATIONS

This application claims priority under 35 U.S.C. §119 from Korean Patent Application No. 10-2011-0095393, filed on Sep. 21, 2011, in the Korean Intellectual Property Office, the disclosure of which is incorporated herein by reference in its entirety.

BACKGROUND

1. Field

Apparatuses and methods consistent with the present inventive concept relate to providing a server, a client device, a method for generating a transport stream thereof and for processing the transport stream thereof, and more particularly, providing a server which transmits scrambled broadcasting contents and processes them, a client device, a method for generating a transport stream thereof, and processing the transport stream thereof.

2. Description of the Related Art

In digital broadcasts, instead of relying on the existing advertising revenues, broadcasters attempt to create added value by providing high-quality broadcasting services to subscribers and subscription-based broadcasting services which collect a television subscription fee from the subscribers. Therefore, transmitted data of various multimedia is protected, and only subscribers who are authorized to receive the data can watch. To this end, the Conditional Access System (CAS) has been developed.

CAS introduces the concept of a subscriber to broadcasts, and enables only subscribers who have secured the right to watch to receive specific programs. CAS entails a series of processes in which each digital broadcast receiver determines whether a receiver can receive any specific broadcasting program. In general, an audio/video (A/V) stream is scrambled with Control Word (CW), and an Entitlement Control Message (ECM) and an Entitlement Management Message (EMM) which are used for encrypting CW are transmitted in a multiplex form on the transmission side of CAS, and ECM and EMM are decrypted by the use of a smart card to recover CW, and the scrambled A/V stream is descrambled on the receiving side of CAS.

In a conventional system, CAS keys required for descrambling ECM and EMM are embedded in a digital rights management (DRM) integrated circuit (IC) or other similar circuit, or the corresponding CAS key is embedded in advance in a storage medium such as, for example, an electrically erasable programmable read-only memory (EEPROM), when receiver manufacturers produce products.

Therefore, in a conventional system, if an embedded CAS key is damaged, scrambled digital broadcasts cannot be descrambled smoothly, because it is not possible to recover the corresponding CAS key on the receiving side, and this results in incurring a replacement cost for a receiving device such as, for example, a television provided to the receiving side. Further, if a CAS key is stolen by a third party, a problem arises that the CAS key cannot be updated from a transmission side to the receiving side.

SUMMARY

Exemplary embodiments address at least the above problems and/or disadvantages and other disadvantages not described above. Also, the exemplary embodiments described below are not required to overcome the disadvantages described above, and an exemplary embodiment may not overcome any of the problems described above.

The present inventive concept provides a server which encrypts a device key in a transport stream and sends the encrypted device key, a client device, and a method for generating a transport stream thereof and for processing the transport stream.

According to an exemplary embodiment, there is provided a method for generating a transport stream, which sends broadcasting content to a client device, comprising scrambling broadcasting content by using a specific key; adding a device key for obtaining the specific key from at least one content-encryption message which includes the specific key and the at least one content-encryption message to the broadcasting content; using a result of the adding to generate a transport stream; and sending the generated transport stream to the client device.

Further, the using a result of the adding to generate the transport stream may include encrypting the device key by using an encryption key which is known by each of the server and the client device, and by adding the encrypted device key to the broadcasting content.

In particular, the at least one content-encryption message may comprise a first content-encryption message which includes an encrypted version of the specific key and a second content-encryption message which includes an encrypted service key for decrypting the encrypted specific key, and the device key may be usable to decrypt the encrypted service key.

In particular, the first content-encryption message may include an Entitlement Control Message (ECM), and the second content-encryption message may include an Entitlement Management Message (EMM).

Further, the using a result of the adding to generate the transport stream may include arranging the at least one content-encryption message and the device key in one packet or arranging each of the at least one content-encryption message and the device key in separate respective packets.

According to an exemplary embodiment, there is provided a method for processing a transport stream of a client device, which processes a transport stream received from a server. The method comprises: receiving a transport stream from the server, wherein at least one content-encryption message which includes a specific key and a device key which is usable for obtaining the specific key from the at least one content-encryption message is added to broadcasting content scrambled by using the specific key; parsing the device key from the transport stream; and storing the parsed device key.

In particular, the device key may be encrypted by using an encryption key which is known by each of the server and the client device.

Further, the at least one content-encryption message may comprise a first content-encryption message which includes an encrypted version of the specific key and a second content-encryption message which includes a service key which is usable for decrypting the encrypted specific key.

The method may further comprise decrypting the device key by using the known encryption key; decrypting an encrypted version of the service key by using the decrypted device key; decrypting the encrypted specific key by using the decrypted service key; and descrambling the scrambled broadcasting content by using the decrypted specific key.

Further, the storing the device key may include updating a prestored device key with the parsed device key and storing the updated device key.

In another exemplary embodiment, a server which sends broadcasting content to a client device comprises a scrambler which scrambles the broadcasting content by using a specific key; a control unit which adds at least one content-encryption message which includes the specific key and a device key which is usable for obtaining the specific key from the at least one content-encryption message to the broadcasting content and uses a result of the adding to generate a transport stream; and a transmission unit which sends the generated transport stream to the client device.

The control unit may encrypt the device key by using an encryption key which is known by each of the server and the client device, and the control unit may generate the transport stream by adding the encrypted device key to the broadcasting content.

In particular, the at least one content-encryption message may comprise a first content-encryption message which includes an encrypted version of the specific key and a second content-encryption message which includes an encrypted service key which is usable for decrypting the encrypted specific key, and the device key may be usable to decrypt the encrypted service key.

In particular, the first content-encryption message may include an Entitlement Control Message (ECM) and the second content-encryption message may include an Entitlement Management Message (EMM).

Further, the control unit may arrange the at least one content-encryption message and the device key in one packet, or the control unit may arrange each of the at least one content-encryption message and the device key in separate respective packets.

According to an exemplary embodiment, there is provided a client device, which processes a transport stream received from a server. The client device comprises: a reception unit which receives a transport stream from a server, wherein the transport stream includes at least one content-encryption message which includes a specific key and a device key usable for obtaining the specific key from the at least one content-encryption message, and broadcasting content which is scrambled by using the specific key; a control unit which parses the device key from the transport stream; and a storage unit which stores the parsed device key.

In particular, the device key may be encrypted by the use of an encryption key which is known by each of the server and the client device.

Further, the at least one content-encryption message may comprise a first content-encryption message which includes an encrypted version of the specific key and a second content-encryption message which includes a service key which is usable for decrypting the encrypted specific key.

The control unit may decrypt the encrypted device key by using the known encryption key; and the control unit may decrypt the encrypted service key by using the decrypted device key; and the control unit may decrypt the encrypted specific key by using the decrypted service key; and the control unit may descramble the scrambled broadcasting content by using the decrypted specific key.

Further, the control unit may update a prestored device key with the parsed device key and store the updated device key in the storage unit.

As described above, according to an exemplary aspect of the present inventive concept, a device key can be changed and updated for a desired period of time and per channel provided that a server sends a device key together with broadcasting content to a client device.

Accordingly, although a device key may be damaged or leaked to a third party, because a client device itself is not changed, a new device key may be added to a transport stream, and the newly added device key may be sent to the client device, a reduction of incurred costs for changing the client device itself may be sought.

BRIEF DESCRIPTION OF THE DRAWINGS

The above and/or other aspects of the present inventive concept will be more apparent by describing certain exemplary embodiments with reference to the accompanying drawings, in which.

DETAILED DESCRIPTION OF EXEMPLARY EMBODIMENTS

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that each exemplary embodiment can be carried out without those specifically defined matters. Also, well-known functions or constructions are not described in detail since they would obscure the present disclosure with unnecessary detail.

Figure 1:
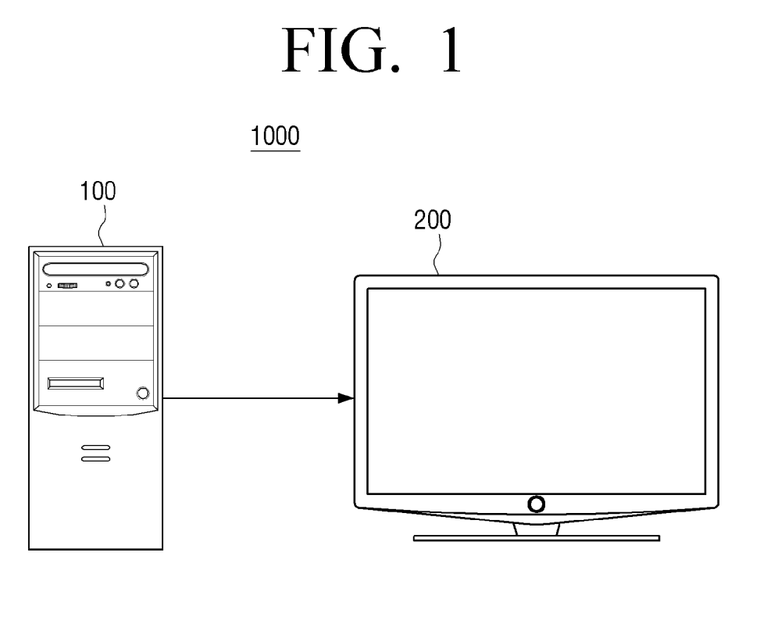
FIG. 1 is a view illustrating a system for sending scrambled broadcasting content and processing the sent scrambled broadcasting content, according to an exemplary embodiment.

FIG. 1 is a view illustrating a system for sending scrambled broadcasting content and processing the scrambled broadcasting content, according to an exemplary embodiment. As illustrated in FIG. 1, the system 1000 may include a server 100 and a client device 200.

The server 100 scrambles broadcasting content received from outside and sends the scrambled broadcasting content to the client device 200. In particular, the server 100 may be embodied as a CAS server which uses the Conditional Access System (CAS), and accordingly, the server may scramble broadcasting contents and send the scrambled broadcasting contents to the client device 200 so that only specific users are able to watch the broadcasting contents. In an exemplary embodiment, the server 100 may send the broadcasting contents to the client device 200 via, for example, a satellite network or a terrestrial network, or any other suitable type of communication network.

In particular, CAS refers to a system which uses the concept of a subscriber with respect to broadcasts, thus enabling only subscribers entitled to receive the broadcasts to watch specific programs.

More particularly, CAS scrambles broadcasting contents using Control Word (CW) on the sending side and sends the scrambled broadcasting contents together with an Entitlement, which is provided to each receiver or to a specific group of receivers to the receiving side. In particular, the Entitlement may include at least one of an Entitlement Management Message (EMM) which manages subscribers' qualifications and an Entitlement Control Message (ECM) which controls subscribers' qualifications.

Further, CAS descrambles broadcasting contents based on a device key, which is retained only by subscribers that are entitled to watch, and the Entitlement on the receiving side. In particular, an encrypted service key which is included in an EMM can be decrypted by using a device key, and CW which is included in an ECM can be decrypted by using the decrypted service key on the receiving side. By descrambling broadcasting contents scrambled by CW, each user can watch the corresponding broadcasting contents.

Still further, the server 100 can add a device key for obtaining CW used in scrambling broadcasting contents to the scrambled broadcasting contents, the EMM, and the ECM, and thus send the device key to the client device 200.

In particular, the server 100 can encrypt a device key by using an encryption key which is known by each of the server 100 and the client device 200, and send the encrypted device key to the client device 200. Therefore, only a specific client device can decrypt a corresponding device key.

The client device 200 parses a device key from a transport stream received from the server 100 and stores the parsed device key. In particular, a transport stream received from the server 100 can be constituted by adding a device key to the EMM, the ECM, and broadcasting contents scrambled by CW.

More particularly, the client device 200 parses an encrypted device key from a transport stream and decrypts the encrypted device key by using an encryption key which is known by each of the server 100 and the client device 200.

The client device 200 decrypts a service key included in the EMM by using the decrypted device key, and decrypts CW included in the ECM by using the decrypted service key. Thereafter, the client device 200 can descramble broadcasting contents scrambled by CW, and a display unit (not shown) equipped in the client device 200 can output the descrambled broadcasting contents.

In an exemplary embodiment, the client device 200 which performs such functions may be a digital television (TV) which receives a broadcast signal and provides the received broadcast signal to a user.

As described above, in accordance with an exemplary embodiment, a device key can be changed and updated for a desired period of time and per channel provided that the server 100 sends a device key together with broadcasting contents to the client device 200.

Accordingly, although a device key may be damaged or leaked to a third party, because a client device itself is not changed, a new device key may be added to a transport stream, and the newly added device key can be sent to the client device, thereby enabling a reduction of costs which would otherwise be incurred to change the client device itself.

Figure 2:
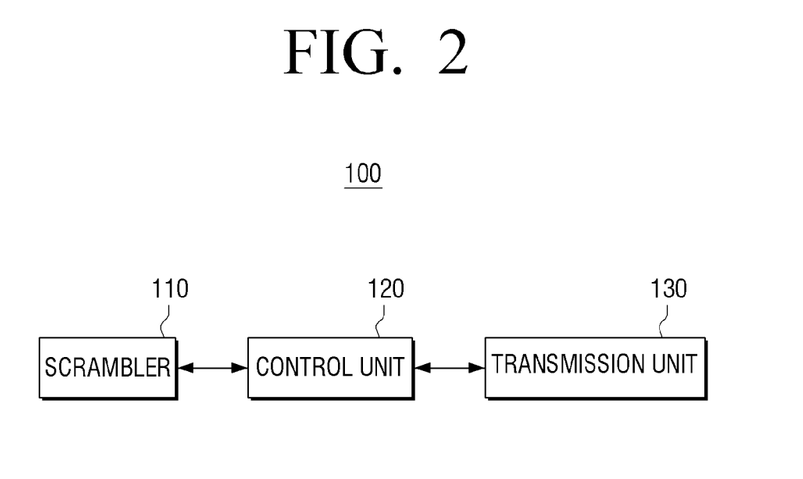
FIG. 2 is a block diagram illustrating a constitution of a server which is used for sending broadcasting content to a client device, according to an exemplary embodiment.

FIG. 2 is a block diagram illustrating the constitution of a server which is used for sending broadcasting contents to a client device, according to an exemplary embodiment. As illustrated in FIG. 2, the server 200 comprises a scrambler 110, a control unit 120, and a transmission unit 130.

The scrambler 110 scrambles broadcasting contents by using a specific key. In particular, the broadcasting contents may be received, for example, from external broadcasting suppliers via satellite or any other suitable source, or may be broadcasting contents prestored in a server. The scrambler 110 may be embodied as a hardware component, such as, for example, a dedicated integrated circuit or a processor, or as a software module which includes instructions for causing a processor to execute a given function or functions.

In particular, the scrambler 110 can scramble data, such as, for example, voice data or video data, by using a specific key so as to protect broadcasting contents from being accessed by those who are not entitled to watch the broadcasting contents. In an exemplary embodiment, the specific key may refer to CW on CAS.

The control unit 120 controls an overall operation of the server 100 by controlling each constitution of the server 100. In particular, the control unit 120 controls the scrambler 110 so that the scrambler 110 may scramble broadcasting contents, and controls the transmission unit 130 so that the transmission unit 130 may send a generated transport stream to a client device. The control unit 120 may be embodied as a hardware component, such as, for example, a dedicated integrated circuit or a processor, or as a software module which includes instructions for causing a processor to execute a given function or functions.

In particular, the control unit 120 can generate a transport stream by adding one or more content-encryption messages which include a specific key and a device key for obtaining the specific key from the content-encryption messages to broadcasting contents.

More particularly, the one or more content-encryption messages may comprise a first content-encryption message which includes an encrypted version of a specific key and a second content-encryption message which includes a service key which is usable for decrypting the encrypted specific key. Accordingly, the first content-encryption message may be an ECM and the second content-encryption message may be an EMM. The service key may also be encrypted.

Further, the control unit 120 can generate an ECM by encrypting a specific key which is used for scrambling broadcasting contents, and the control unit 120 can also generate an EMM by encrypting a service key which can be used to decrypt the encrypted specific key.

The control unit 120 can generate a transport stream by adding a device key which can decrypt an encrypted specific key to scrambled broadcasting contents, an EMM, and an ECM, and to this end, the control unit 120 may comprise a multiplexer (not shown) which may be used to multiplex the scrambled broadcasting contents, the EMM, the ECM, and the device key.

In particular, the control unit 120 can generate a transport stream by encrypting a device key through the use of an encryption key which is known by each of a server and a client device, and then adding the encrypted device key to broadcasting contents.

Further, the control unit 120 can generate a transport stream by arranging one or more content-encryption messages and a device key in one packet, or by arranging each of the one or more content encryption messages and the device key in separate respective packets. Accordingly, the control unit 120 can constitute a transport stream by adding a device key to a specific region prepared in an EMM packet or an ECM packet, or by generating a packet which includes a device key and is independent of either of the EMM packet or the ECM packet.

The transmission unit 130 sends a generated transport stream to a client device. In particular, the transmission unit 130 can send a transport stream which includes scrambled broadcasting contents, an ECM, an EMM, and a device key to a client device in a wired or wireless form. The transmission unit 130 may be embodied as a hardware component, such as, for example, a transmitter or a transceiver, or any type of device which is suitable for enabling electronic communications.

Figure 3:
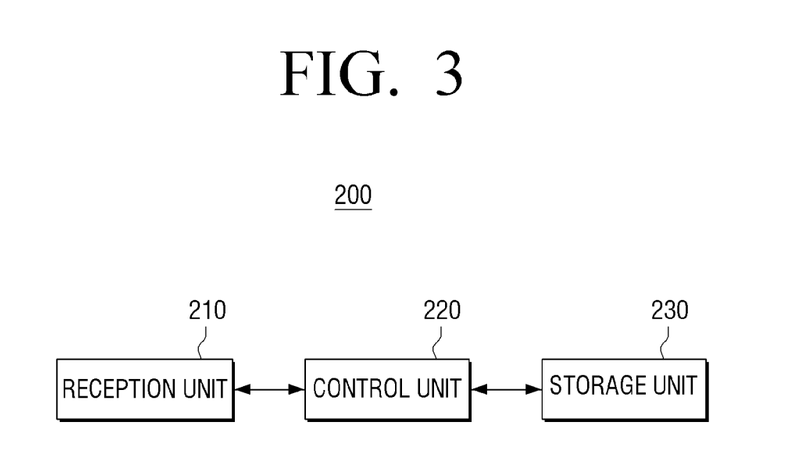
FIG. 3 is a block diagram illustrating a constitution of a client device which is used for processing a transport stream received from a server, according to an exemplary embodiment.

FIG. 3 is a block diagram illustrating a constitution of a client device which is used for processing a transport stream received from a server, according to an exemplary embodiment. As illustrated in FIG. 3, the client device 200 comprises a reception unit 210, a control unit 220, and a storage unit 230.

The client device 200 may be embodied as a structure which connects a television to an existing fixed Set-Top-Box (STB), or as a mobile multi-communication terminal which may include, for example, a digital multimedia broadcasting (DMB) telephone or a notebook.

The reception unit 210 can receive a transport stream sent by a server in a wired or wireless form. The reception unit 210 may be embodied as a hardware component, such as, for example, a receiver or a transceiver, or any type of device which is suitable for enabling electronic communications.

In particular, the transport stream may be a stream wherein one or more content-encryption messages which include a specific key and a device key which is usable for obtaining the specific key from the one or more content-encryption messages are added to broadcasting contents scrambled by the specific key.

The content-encryption messages may comprise a first content-encryption message which includes an encrypted version of a specific key and a second content-encryption message which includes a service key which is usable for decrypting the encrypted specific key encrypted. In an exemplary embodiment, the first content-encryption message may be an ECM and the second content-encryption message may be an EMM.

Further, the device key may be usable to decrypt an encrypted service key.

The control unit 220 controls an overall operation of the client device 200 by controlling each constitution of the client device 200. The control unit 220 may be embodied as a hardware component, such as, for example, a dedicated integrated circuit or a processor, or as a software module which includes instructions for causing a processor to execute a given function or functions.

In particular, the control unit 220 controls the reception unit 210 so that the reception unit 210 may receive a transport stream from a server, and controls the storage unit 230 so that the storage unit 230 may store a parsed device key.

In particular, the control unit 220 can parse a device key from a transport stream. More particularly, when a device key is added to ECM packets or EMM packets, the control unit 220 can parse the device key from the corresponding ECM packet or EMM packet, and when a device key is added to a separate packet, the control unit 220 can parse the device key from the corresponding packet.

Further, the parsed device key may be encrypted by an encryption key which is known by each of a server and a client device. Therefore, the control unit 220 can decrypt the parsed device key by using the known encryption key, and then store the decrypted device key in the storage unit 230. Still further, the known encryption key may be a built-in key which is stored in the client device 200 itself, or alternatively, the known encryption key may include a key which is inserted for encryption independently of a built-in key.

The control unit 220 can decrypt an encrypted service key by using a device key, decrypt an encrypted specific key by using the decrypted service key, and descramble scrambled broadcasting contents by using the decrypted specific key.

In particular, the control unit 220 decrypts a service key from a second content-encryption message by using a decrypted device key, and decrypts a specific key from a first content-encryption message by using the decrypted service key. The control unit 220 descrambles scrambled broadcasting contents by using the decrypted specific key, and an output unit (not shown) equipped in a client device then outputs signals which may contain, for example, voice and/or video data.

As above, the control unit 220 can descramble scrambled broadcasting contents by using a device key included in a transport stream.

Further, the control unit 220 can update a prestored device key with a parsed device key and then store the parsed device key in the storage unit 230. In particular, the control unit 220 can compare a prestored device key and a device key parsed from transport streams, and if the comparison result shows that the prestored device key and the parsed device key do not coincide with each other, the control unit 220 can delete the prestored device key from the storage unit 230 and store the newly parsed device key in the storage unit 230.

The storage unit 230 stores a parsed device key. In particular, the storage unit 230 can store a decrypted device key by using an encryption key which is known by each of a server and a client device. Further, the storage unit 230 may update a prestored device key with a parsed device key and store the parsed device key.

The storage unit 230 which performs such functions may be embodied as volatile memory, or as non-volatile memory such as, for example, flash memory, an Electrically Erasable and Programmable ROM (EEPROM), a Hard Disk Drive), and the like.

Other client devices 200 may comprise, for example, one or more of the following: a tuner, a demodulator, a multiplexer/demultiplexer, a filter, a descrambler, an other deinterleaver/Reed-Solomon (RS) decoder, and the like. An A/V decoder can be selectively included, and when not being embodied, a software (S/W) decoder may be used in a personal computer (PC).

Figure 4:
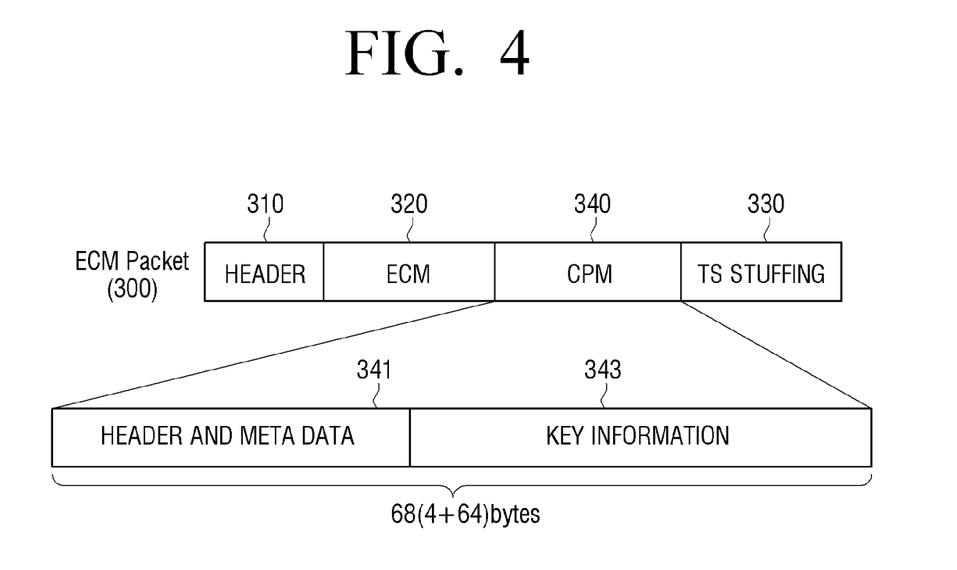
FIG. 4 is a view illustrating an ECM packet which includes a device key, according to an exemplary embodiment.

FIG. 4 is a view illustrating an ECM packet which includes a device key, according to an exemplary embodiment. As illustrated in FIG. 4, the ECM packet 300 includes 188 bytes, and may comprise a four-byte header 310, ECM data 320, and a stuffing area 330.

In particular, the header 310 may comprise a packet identifier (PID) and information on whether or not information included in the ECM packet 300 is scrambled.

Further, the ECM data 320 may comprise encrypted CW and at least one control parameter.

Further, the stuffing area 330 may comprise dummy data to ensure that the ECM packet 300 includes a total of 188 bytes. Accordingly, a Configuration and Provisioning Message (CPM) 340, which includes information relating to a device key, can be added to a part of the stuffing area 330 in the ECM packet 300.

In particular, CPM 340 comprises four-byte header and meta data field 341, and 64-byte device key data field 343, and may include a total of 68 bytes.

In the embodiment described above, the ECM packet includes a device key, and this is merely an example. In particular, a device key can be added to the ECM packet, or alternatively, the device key can be used to form a separate packet in a transport stream.

Figure 5:
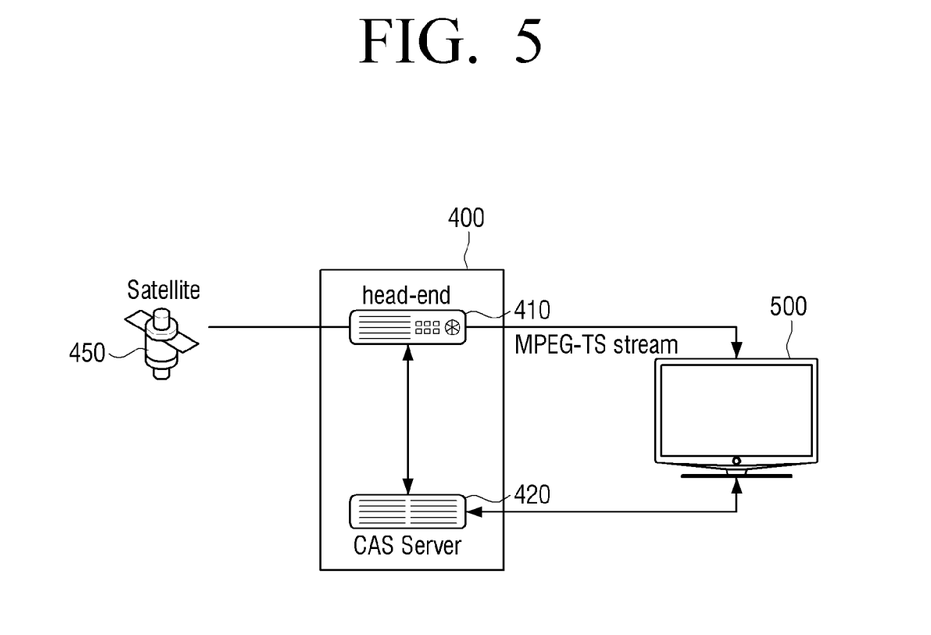
FIG. 5 is a view illustrating a system for applying a server and a client device according to an exemplary embodiment.

FIG. 5 is a view illustrating a system for applying a server and a client device according to an exemplary embodiment. As illustrated in FIG. 5, the server 400 comprises head-end 410 and CAS server 420.

The head-end 410 comprises a scrambler (not shown) which scrambles broadcasting contents received from a satellite 450 by using a specific key.

The CAS server 420 generates an ECM by encrypting a specific key used for scrambling broadcasting contents in the head-end 410, and generates an EMM by encrypting a service key which can be used to decrypt the encrypted specific key.

The CAS server 420 encrypts a device key which can be used to decrypt the encrypted service key, and then sends the encrypted device key to the head-end 410. In particular, the CAS server 420 can encrypt a device key by using an encryption key which is known by each of the CAS server 420 and the client device 500, and then send the encrypted device key to the head-end 410.

The head-end 410 multiplexes an ECM, an EMM, and a device key received from the CAS server 420 with scrambled broadcasting contents, modulates the multiplexed ECM, EMM, and device key, and then generates a Motion Picture Expert Group (MPEG) transport stream (MPEG-TS). The head-end 410 then sends the MPEG-TS to the client device 500 by using, for example, a coaxial cable.

Although FIG. 5 illustrates only one client device, this is merely an example. A head-end can send an MPEG-TS to a plurality of client devices by using coaxial cable.

The client device 500 receives the MPEG-TS and demodulates the received transport stream.

The client device 500 parses a device key from the demodulated MPEG-TS. The client device 500 decrypts the parsed device key by using a device key which is known by each of the client device 500 and the CAS server 420, and then stores the decrypted device key in the client device 500.

Further, the client device 500 can descramble scrambled broadcasting contents by using the decrypted device key. In particular, the client device 500 decrypts an encrypted service key from the EMM by using the decrypted device key, decrypts a specific key from the ECM by using the decrypted service key, and descrambles scrambled broadcasting contents by using the decrypted specific key.

A signal processing unit (not shown) included in the client device 500 performs signal processing, such as, for example, one or more of video decoding, video scaling, and audio decoding for video and/or voice signals, and an output unit (not shown) outputs the processed video and/or voice signals.

Figure 6:
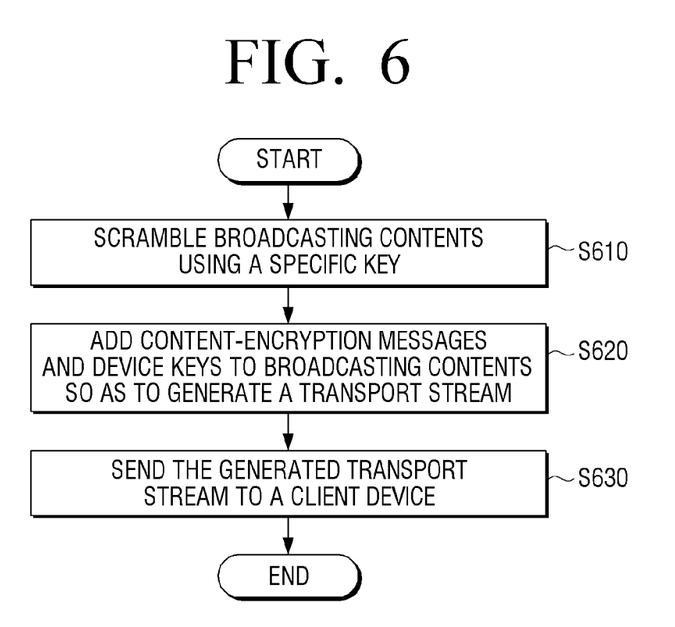
FIG. 6 is a flowchart schematically illustrating a method for generating a transport stream of a server which is used for sending broadcasting content to a client device, according to an exemplary embodiment.

FIG. 6 is a flowchart schematically illustrating a method for generating a transport stream of a server which is used for sending broadcasting contents to a client device, according to an exemplary embodiment.

First, broadcasting contents are scrambled by using a specific key (operation S610).

Thereafter, a transport stream is generated by adding one or more content-encryption messages which include a specific key and a device key which is usable for obtaining the specific key from the one or more content-encryption messages to the broadcasting contents (operation S620).

In particular, the one or more content-encryption messages may comprise a first content-encryption message which includes an encrypted version of a specific key and a second content-encryption message which includes a service key which is usable to decrypt the encrypted specific key. More particularly, the first content-encryption message may correspond to an EMM (Entitlement Management Message) and the second content-encryption message may correspond to an ECM (Entitlement Control Message).

Further, the device key may correspond to a key which is usable to decrypt an encrypted service key.

The generated transport stream is then sent to a client device (operation S630).

In particular, the transport stream may be generated by encrypting a device key by using an encryption key which is known by each of a server and a client device, and then adding the encrypted device key to broadcasting contents.

Further, the transport stream can be generated by arranging the one or more content-encryption messages and the device key in one packet, or by arranging each of the one or more content-encryption messages and the device key in separate respective packets.

Figure 7:
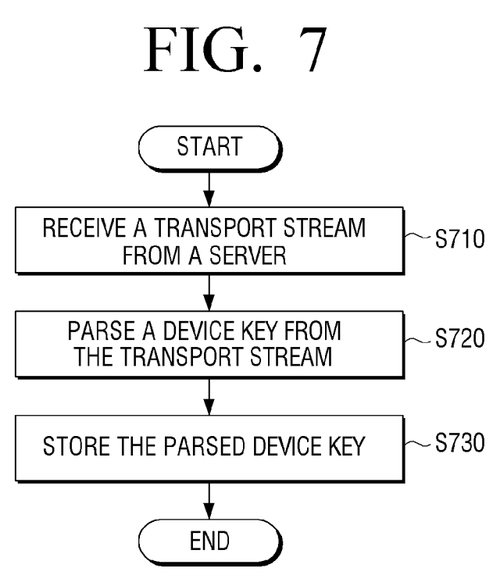
FIG. 7 is a flowchart schematically illustrating a method for processing a transport stream of a client device which is used for processing a transport stream received from a server, according to an exemplary embodiment.

FIG. 7 is a flowchart schematically illustrating a method for processing a transport stream of a client device which is used for processing a transport stream received from a server, according to an exemplary embodiment.

First, a transport stream is received from a server, wherein one or more content-encryption messages which include a specific key and a device key which is usable to obtain the specific key from the one or more content-encryption messages are added to broadcasting contents scrambled by the specific key (operation S710).

In particular, the one or more content-encryption messages may comprise a first content-encryption message which includes an encrypted version of a specific key and a second content-encryption message which includes a service key which is usable to decrypt the encrypted specific key.

Further, the device key may be used to decrypt an encrypted service key, and can be encrypted by using an encryption key which is known by each of a server and a client device.

Thereafter, the device key is parsed from the transport stream (operation S720).

The parsed device key is stored (operation S730).

In particular, the parsed device key can be stored by being decrypted and then updating a prestored device key with the parsed device key.

In some exemplary embodiments, the method for processing a transport stream comprises decrypting an encrypted device key by using a known encryption key, decrypting an encrypted service key by using the decrypted device key, decrypting an encrypted specific key by using the decrypted service key, and descrambling scrambled broadcasting contents by using the decrypted specific key.

Accordingly, an immediate key update is possible when a loss of a device key or hacking occurs.

Further, separate channels are not required, and a CAS key update can be performed by using transport stream packets of currently broadcasted digital cable TV contents.

Further, if necessary, a private CAS key can be generated per channel and content.

In particular, as described above with respect to the exemplary embodiments, there is provided storage media which include programs for performing the method for generating a transport stream and the method for processing the transport stream according to an exemplary embodiment, namely, computer readable recording media, including at least one non-transitory computer readable recording medium. Herein, the at least one non-transitory computer readable recording medium may include any type of recording medium in which stored data which can be read by a computer system. Examples of the computer readable recording media include read-only memory (ROM), random access memory (RAM), compact disk-read-only memory (CD-ROM), magnetic tape, floppy disk, optical data storage device, and the like. The computer readable recording medium may be dispersed over a computer system connected in a network, and a code which can be read by a computer may be stored and performed in a manner of the dispersion.

The foregoing exemplary embodiments and advantages are merely exemplary and are not to be construed as limiting the present inventive concept. The present disclosure can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for generating a transport stream of a server which sends broadcasting content to a client device, the method comprising:
    scrambling broadcasting content by using a specific key;
    adding, to the broadcasting content, a device key encrypted by using an encryption key which is known by each of the server and the client device and at least one content-encryption message which includes an encrypted version of the specific key and an encrypted version of a service key, wherein the service key is usable to decrypt the encrypted version of the specific key from the at least one content-encryption message to descramble the broadcasting content, wherein the device key is usable to decrypt an encrypted service key;
    using a result of the adding to generate a transport stream; and
    sending the generated transport stream to the client device.

2. The method of claim 1, wherein the at least one content-encryption message comprises a first content-encryption message which includes the encrypted version of the specific key and a second content-encryption message which includes the encrypted service key to decrypt the encrypted specific key.

3. The method of claim 2, wherein the first content-encryption message comprises an Entitlement Control Message (ECM); and
    wherein the second content-encryption message comprises an Entitlement Management Message (EMM).

4. The method of claim 1, wherein the using the result of the adding to generate the transport stream comprises arranging the at least one content-encryption message and the device key in one packet or arranging each of the at least one content-encryption message and the device key in separate respective packets.

5. A method for processing a transport stream of a client device which processes a transport stream received from a server, the method comprising:
    receiving a transport stream from the server, wherein a device key encrypted by using an encryption key which is known by each of the server and the client device and at least one content-encryption message which includes an encrypted version of a specific key and an encrypted version of a service key are added to broadcasting content scrambled by the specific key, and the service key is usable to decrypt the encrypted version of the specific key from the at least one content-encryption message to descramble the broadcasting content, and the device key is usable to decrypt an encrypted service key;
    parsing the device key from the transport stream; and
    storing the parsed device key.

6. The method of claim 5, wherein the at least one content-encryption message comprises a first content-encryption message which includes the encrypted version of the specific key and a second content-encryption message which includes the service key.

7. The method of claim 6, further comprising:
    decrypting the device key by using the known encryption key;
    decrypting an encrypted version of the service key by using the decrypted device key;
    decrypting the encrypted specific key by using the decrypted service key; and
    descrambling the scrambled broadcasting content by using the decrypted specific key.

8. The method of claim 5, wherein the storing the device key comprises updating a prestored device key with the parsed device key and storing the updated device key.

9. A server which sends broadcasting content to a client device, the server comprising:
    a scrambler which scrambles the broadcasting content by using a specific key;
    a control unit which adds a device key encrypted by using an encryption key which is known by each of the server and the client device and at least one content-encryption message which includes an encrypted version of the specific key and an encrypted version of a service key to the broadcasting content and uses a result of the adding to generate a transport stream, wherein the service key is usable to decrypt the encrypted version of the specific key from the at least one content-encryption message to descramble the broadcasting content, wherein the device key is usable to decrypt an encrypted service key; and
    a transmission unit which sends the generated transport stream to the client device.

10. The server of claim 9, wherein the at least one content-encryption message comprises a first content-encryption message which includes the encrypted version of the specific key and a second content-encryption message which includes the encrypted service key which is usable to decrypt the encrypted specific key.

11. The server of claim 10, wherein the first content-encryption message comprises an Entitlement Control Message (ECM); and
    the second content-encryption message comprises an Entitlement Management Message (EMM).

12. The server of claim 9, wherein the control unit arranges the at least one content-encryption message and the device key in one packet or arranges each of the at least one content-encryption message and the device key in separate respective packets.

13. A client device which processes a transport stream received from a server, the client device comprising:
    a reception unit which receives a transport stream from the server, wherein the transport stream includes a device key encrypted by using an encryption key which is known by each of the server and the client device, at least one content-encryption message which includes an encrypted version of a specific key and an encrypted version of a service key, and broadcasting content which is scrambled by using the specific key, and the service key is usable to decrypt the encrypted version of the specific key from the at least one content-encryption message to descramble the broadcasting content, wherein the device key is usable to decrypt an encrypted service key;
    a control unit which parses the device key from the transport stream; and
    a storage unit which stores the parsed device key.

14. The client device of claim 13, wherein the at least one content-encryption message comprises a first content-encryption message which includes the encrypted version of the specific key and a second content-encryption message which includes the service key.

15. The client device of claim 14, wherein the control unit decrypts the encrypted device key by using the known encryption key, decrypts an encrypted version of the service key by using the decrypted device key, decrypts the encrypted specific key by using the decrypted service key, and descrambles the scrambled broadcasting content by using the decrypted specific key.

16. The client device of claim 13, wherein the control unit updates a prestored device key with the parsed device key and stores the updated device key in the storage unit.

* * * * *